US007345692B2

(12) United States Patent
Wada (10) Patent No.: US 7,345,692 B2
(45) Date of Patent: Mar. 18, 2008

(54) ENVIRONMENT-COMPLIANT IMAGE DISPLAY SYSTEM AND IMAGE PROCESSING METHOD

(75) Inventor: Osamu Wada, Ina (JP)

(73) Assignee: Seiko Epson Corporation, Tokyo (JP)

( * ) Notice: Subject to any disclaimer, the term of this patent is extended or adjusted under 35 U.S.C. 154(b) by 44 days.

(21) Appl. No.: 10/111,323

(22) PCT Filed: Aug. 28, 2001

(86) PCT No.: PCT/JP01/07375

§ 371 (c)(1),
(2), (4) Date: Apr. 24, 2002

(87) PCT Pub. No.: WO02/19306

PCT Pub. Date: Mar. 7, 2002

(65) Prior Publication Data

US 2002/0171766 A1 Nov. 21, 2002

(30) Foreign Application Priority Data

Aug. 28, 2000 (JP) ............................. 2000-257159

(51) Int. Cl.
*G09G 5/02* (2006.01)
(52) U.S. Cl. .................. 345/600; 345/589; 345/590; 345/603; 345/604; 345/690; 382/167; 382/274
(58) Field of Classification Search ........ 348/602–603, 348/234, 631, 687, 744, 655, 236–239, 227.1, 348/658; 345/589, 601, 22, 88, 77, 590, 345/603, 604; 357/243; 358/29, 223.1, 358/518, 520, 523; 378/712–713; 386/44, 386/663; 382/167–168, 274
See application file for complete search history.

(56) References Cited

U.S. PATENT DOCUMENTS

| 4,875,032 | A | * | 10/1989 | McManus et al. .......... 345/603 |
| 5,258,828 | A | * | 11/1993 | Sano et al. ................. 348/658 |
| 5,315,378 | A | * | 5/1994 | Satou et al. ................ 348/655 |
| 5,737,032 | A | * | 4/1998 | Stenzel et al. ............. 348/649 |
| 5,803,570 | A | * | 9/1998 | Chen et al. ................. 353/122 |
| 5,818,597 | A | * | 10/1998 | Hibbard et al. ............. 356/121 |
| 5,835,614 | A | * | 11/1998 | Aoyama et al. ............ 382/104 |
| 5,870,069 | A | | 2/1999 | Choh et al. .................. 345/22 |
| 6,081,254 | A | * | 6/2000 | Tanaka et al. .............. 382/167 |
| 6,081,256 | A | * | 6/2000 | Herget et al. ............... 345/159 |

(Continued)

FOREIGN PATENT DOCUMENTS

GB 2 335 326 9/1999

(Continued)

OTHER PUBLICATIONS

U.S. Appl. No. 10/111,321, filed Apr. 24, 2002, Wada.

(Continued)

*Primary Examiner*—Kee M. Tung
*Assistant Examiner*—Antonio A Caschera
(74) *Attorney, Agent, or Firm*—Oliff & Berridge, PLC (57) ABSTRACT

To provide an environment-compliant image display system, image processing method, and information storage medium that enable correction of images within a shorter time, a Y value of color signals (Y3, x3, y3) measured by a color light sensor 60 and converted by an Y3x3y3 conversion section 143 is replaced with Y1, which is a Y value of an ideal environment, by a Y replacing section 142; color difference between the replaced color signals (Y1, x3, y3) and ideal color signals (Y1, x1, y1) is obtained by a color difference calculation section 145; and image display information is corrected by using that color difference (Δx, Δy).

5 Claims, 7 Drawing Sheets

U.S. PATENT DOCUMENTS

| | | | |
|---|---|---|---|
| 6,118,485 A * | 9/2000 | Hinoue et al. | 348/373 |
| 6,388,648 B1 * | 5/2002 | Clifton et al. | 345/88 |
| 6,480,202 B1 * | 11/2002 | Deguchi et al. | 345/600 |
| 6,529,212 B2 * | 3/2003 | Miller et al. | 345/690 |
| 6,807,301 B1 * | 10/2004 | Tanaka | 382/169 |
| 6,940,531 B2 * | 9/2005 | Wada | 345/690 |
| 7,164,428 B2 * | 1/2007 | Wada et al. | 345/590 |
| 2001/0040588 A1 * | 11/2001 | Shiraiwa et al. | 345/690 |
| 2002/0012461 A1 * | 1/2002 | MacKinnon et al. | 382/164 |

FOREIGN PATENT DOCUMENTS

| | | | |
|---|---|---|---|
| GB | 2335326 | * | 9/1999 |
| GB | 2 341 033 | | 3/2000 |
| GB | 2341033 | * | 3/2000 |
| JP | A 4-25892 | | 1/1992 |
| JP | A 4-53374 | | 2/1992 |
| JP | A 5-236371 | | 9/1993 |
| JP | A-07-159241 | | 6/1995 |
| JP | A-07-231394 | | 8/1995 |
| JP | A 8-292752 | | 11/1996 |
| JP | 10 174017 | | 6/1998 |
| JP | A 11-231282 | | 8/1999 |
| JP | A 2001-60082 | | 3/2001 |

OTHER PUBLICATIONS

U.S. Appl. No. 10/111,357, filed Apr. 24, 2002, Wada et al.
"Handbook of Color Science", second edition, pp. 102-111, published by University of Tokyo Press (w/ concise explanation).

* cited by examiner

ENVIRONMENT-COMPLIANT IMAGE DISPLAY SYSTEM AND IMAGE PROCESSING METHOD

TECHNICAL FIELD

The present invention relates to an environment-compliant image display system, an image processing method, and an information storage medium.

BACKGROUND ART

When presentations or meetings are to be performed at a plurality of different locations, an important part of achieving an effective presentation is to make it possible to reproduce images exactly as the creator of those images intended, whatever the location.

However, external light or artificial light could strike the display area in which the image is displayed in practice, so there can be a huge difference between the ideal image appearance and the actual image appearance.

Particularly when an image is to be projected and displayed by using a screen and projector, the image appearance can be greatly affected by the type of the screen.

If a screen that uses a diffused reflective plate is used, by way of example, the reflectivity of such a screen is at least 90%, so an image thereon is seen to be much brighter than on an ordinary screen having a reflectivity on the order of 70%.

In addition, the distance between the screen and the projector will also change the image appearance.

Furthermore, it takes time to correct colors manually to ensure that the actual image appearance is adjusted to the ideal image appearance. For that reason if the user carries a projector to a client's location, it takes some time to correct colors before the start of the presentation, and thus the starting time of the presentation could be delayed for this correction.

DISCLOSURE OF INVENTION

The present invention was devised in the light of the above-described technical problem and may provide an environment-compliant image display system, image processing method, and information storage medium that make it possible to implement substantially the same image appearance, within a short time.

(1) In order to solve the above described problem, an image display system of environment-compliant type which corrects image display information for displaying an image and displays the image, based on viewing environment information obtained by viewing environment detection means which detects a viewing environment in a display area of the image; the image display system comprising:

brightness correction means for correcting brightness information included in the viewing environment information to conform with brightness of an ideal environment, based on the viewing environment information, when brightness of the image in the viewing environment differs from brightness of the image in the ideal environment;

color difference calculation means for calculating color difference between color information included in the viewing environment information, in which the brightness information has been corrected, and color information of the image in the ideal environment; and image correction means for correcting the image display information, based on the calculated color difference.

(2) The present invention further relates to an image display system of environment-compliant type which corrects image display information for displaying an image and displays the image, based on viewing environment information obtained by viewing environment detection means which detects a viewing environment in a display area of the image; the image display system comprising:

a brightness correction section which corrects brightness information included in the viewing environment information to conform with brightness of an ideal environment, based on the viewing environment information, when brightness of the image in the viewing environment differs from brightness of the image in the ideal environment;

a color difference calculation section which calculates color difference between color information included in the viewing environment information, in which the brightness information has been corrected, and color information of the image in the ideal environment; and an image correction section which corrects the image display information, based on the calculated color difference.

The present invention makes it possible to obtain a color difference for color alone, excluding the brightness element, by correcting the brightness information that indicates the brightness of the image in the viewing environment to conform with the brightness in an ideal environment.

This makes it possible to correct image display information rapidly, by applying the color difference as correction amount, by way of example.

It is therefore possible to implement an image display system that enables corrections of the image appearance, within a short time.

Note that the brightness information may be data such as the L value of colors expressed in Lab format or the Y value of colors expressed in Yxy format (or xyY format), by way of example. Similarly, the color information may be the a and b values of colors expressed in Lab format or the x and y values of colors expressed in Yxy format.

The x value, y value, and z value in this case represent ratios of X to Y to Z that add up to 1, and a color gamut can be expressed as a bell-shaped color triangle on an xy chromaticity diagram by representing them in Yxy format. The Lab format may also be used, enabling representation of the color gamut as a circle. The Yxy format and Lab format are detected as international standards by the International Commission on Illumination (CIE). The image display information corresponds to data such as an input-output profile or look-up table.

(3) In this image display system, the viewing environment detection means may measure tristimulus values of an image in the display area or captures an image in the display area.

Since the measurement of the luminance of the image or the capture of the image can be done irrespective of the distance between the display means and the display area, this makes it possible to detect the viewing environment appropriately, even if the distance between the display means and the display area should change.

Note that the tristimulus values of the image may be XYZ values, RGB values, or xbar, ybar, and zbar values, or rbar, gbar, and bbar values which are color matching function values of those XYZ values and RGB values, by way of example.

(4) This image display system may also comprise a front-projection type image projection device including:
the brightness correction means;
the color difference calculation means;
the image correction means; and means which projects a corrected image towards the display area.

This makes it possible to detect the viewing environment appropriately by using the viewing environment detection means even when using a front-projection type image projection device (such as a projector) and the distance between the projection means and the screen having a display area has been altered by a change in the environment in which it is installed.

(5) In this image display system, image information for the ideal environment and the viewing environment information may be expressed in Lab format or Yxy format; and the brightness correction means may replace the L value or Y value of the viewing environment information with the L value or Y value of the image information for the ideal environment.

This makes it possible to rapidly obtain a color difference between the color values x3 and y3 included in the viewing environment information and the color values x1 and y1 for the ideal environment, when an image is expressed in Yxy format, by way of example, by replacing the brightness value Y3 included in the viewing environment information with the brightness value Y1 for the ideal environment. Note that the image information may be an original image, by way of example.

If a projector is used to project an image on a screen, for example, the viewing environment information will be affected by the distance between the projector and the screen. This means that the image will appear darker with distance. In other words, the brightness information (L value or Y value) included in the viewing environment information will vary depending on the distance. The color information in the viewing environment information will not, however, be affected by the distance. In general, color has more effect than brightness on the image appearance.

In other words, there is little effect on the image appearance, even when the brightness value included in the viewing environment information is replaced with the brightness value for the ideal environment. It is therefore possible to adjust the image appearance as appropriate, without having to detect the viewing environment again, even if the distance between the display area of the image (such as a screen) and the viewing environment detection means has changed. This makes it possible to implement an image display system that enables corrections of the image appearance, within a short time.

(6) The present invention still further relates to an image processing method of environment-compliant type which corrects image display information for displaying an image, based on viewing environment information indicating a viewing environment in a display area of the image, the image processing method comprising:

a step of generating the viewing environment information;

a color difference detection step of detecting color difference between a given image in the viewing environment and the given image in an ideal environment, based on the generated viewing environment information; and a step of correcting the image display information, based on the detected color difference.

The present invention makes it possible to correct image display information rapidly, by applying color difference as correction amount, by way of example.

It is therefore possible to correct the image appearance, within a short period of time.

(7) In this image processing method, the viewing environment information may comprise color information indicating color of the image in the viewing environment and brightness information indicating brightness of the image in the viewing environment; and the color difference detection step may comprise:

a brightness correction step which corrects brightness information included in the viewing environment information to conform with brightness of the ideal environment, based on the viewing environment information, when brightness of the image in the viewing environment differs from brightness of the image in the ideal environment; and a step of calculating the color difference based on color information included in the viewing environment information, in which the brightness information has been corrected, and color information of the image in the ideal environment.

This makes it possible to obtain color difference for color alone, excluding the brightness element, by correcting the brightness information that indicates the brightness of the image in the viewing environment to conform with the brightness in an ideal environment.

The correction of color of the image can be done more rapidly by using color difference that takes only colors into account.

(8) In this image processing method, image information for the ideal environment and the viewing environment information may be expressed in Lab format or Yxy format; and the brightness correction step may comprise a step of replacing the L value or Y value of the viewing environment information with the L value or Y value of the image information for the ideal environment.

This makes it possible to rapidly obtain the color values x3 and y3 included in the viewing environment information and the color values x1 and y1 for the ideal environment, when an image is expressed in Yxy format, byway of example, by replacing the brightness value Y3 included in the viewing environment information with the brightness value Y1 for the ideal environment.

(9) The present invention yet further relates to a computer-readable information storage medium which stores program for correcting image display information for displaying an image, based on viewing environment information indicating a viewing environment in a display area of the image, the information storage medium comprising program to implement on a computer:

means which generates the viewing environment information;

color difference detection means which detects color difference between a given image in the viewing environment and the given image in an ideal environment, based on the generated viewing environment information; and means which corrects the image display information, based on the detected color difference.

The present invention makes it possible to correct image display information rapidly, by applying color difference as correction amount, by way of example.

It is therefore possible to correct the image appearance, within a short period of time.

(10) In this information storage medium, the viewing environment information may comprise color information indicating color of the image in the viewing environment and brightness information indicating brightness of the image in the viewing environment; and the color difference detection means may comprise:

brightness correction means which corrects brightness information included in the viewing environment information to conform with brightness in the ideal environment, based on the viewing environment information, when brightness of the image in the viewing environment differs from brightness of the image in the ideal environment; and means which calculates the color difference based on color information included in the viewing environment information, in which the brightness information has been corrected, and color information of the image in the ideal environment.

This makes it possible to obtain color difference for color alone, excluding the brightness element, by correcting the brightness information that indicates the brightness of the image in the viewing environment to conform with the brightness in an ideal environment.

The correction of color of the image can be done more rapidly by using color difference that takes only colors into account.

(11) In thia information storage medium, image information for the ideal environment and the viewing environment information may be expressed in Lab format or Yxy format; and the brightness correction means may replace the L value or Y value of the viewing environment information with the L value or Y value of the image information for the ideal environment.

This makes it possible to rapidly obtain the color values x3 and y3 included in the viewing environment information and the color values x1 and y1 for the ideal environment, when an image is expressed in Yxy format, byway of example, by replacing the brightness value Y3 included in the viewing environment information with the brightness value Y1 for the ideal environment.

BEST MODE FOR CARRYING OUT THE INVENTION

The description below relates to a case in which the present invention is applied to an image display system which uses a liquid-crystal projector, with reference to the accompanying figures. Note that the embodiments described herein do not in any way limit the scope of the invention as defined by the claims. Similarly, the entirety of the configuration described for these embodiments does not place any limitations on the essential components of the means in accordance with the present invention, as laid out herein.

Description of Overall System

Figure 1:
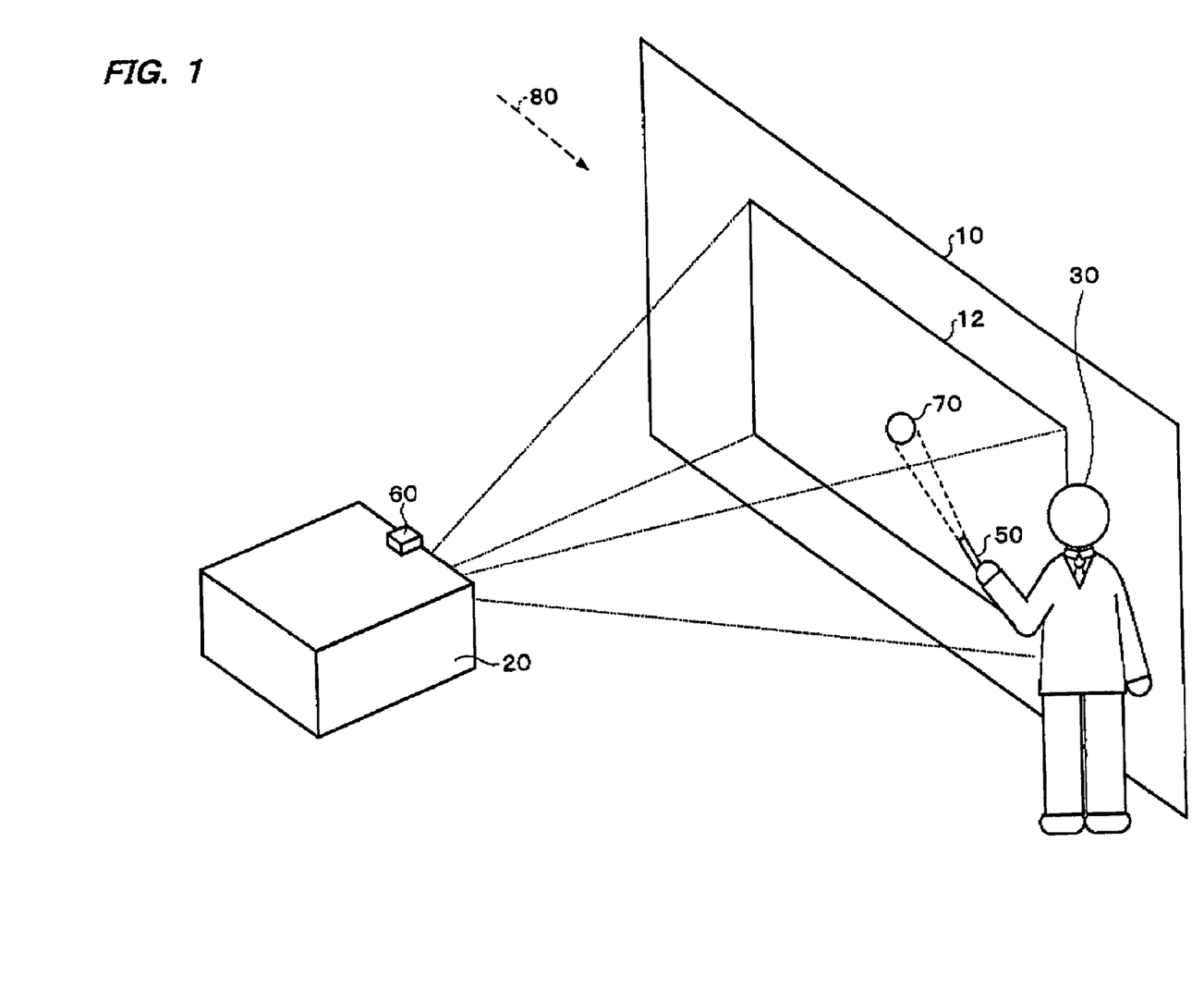
FIG. 1 is a schematic illustrative view of an image display system in accordance with an example of this embodiment.

A schematic illustrative view of an image display system in accordance with an example of this embodiment of the present invention is shown in FIG. 1.

A projector 20, which is a front-projection type display device provided substantially facing a screen 10, projects an image for a predetermined presentation. A presenter 30 gives a presentation to an audience, while using a light spot 70 projected from a laser pointer 50 to point at a desired position of an image in an image display region 12, which is a display area on the screen 10.

During such a presentation, the image appearance on the image display region 12 will vary greatly, depending on factors such as the type of the screen 10 and ambient light 80. When the projector 20 displays the same white, for example, the type of the screen 10 could make it seem to be white with a yellow cast or white with a blue cast. Similarly, differences in the ambient light 80 could make the same white that is displayed by the projector 20 appear to be a bright white or a dull white.

In recent years, this projector 20 has become smaller and easier to transport. For that reason, it has become possible for the presenter 30 to perform presentations at a client's location, byway of example, but it is difficult to adjust colors to match the environment at the client's location and the manual adjustment of colors at the client's location takes too much time.

Figure 2:
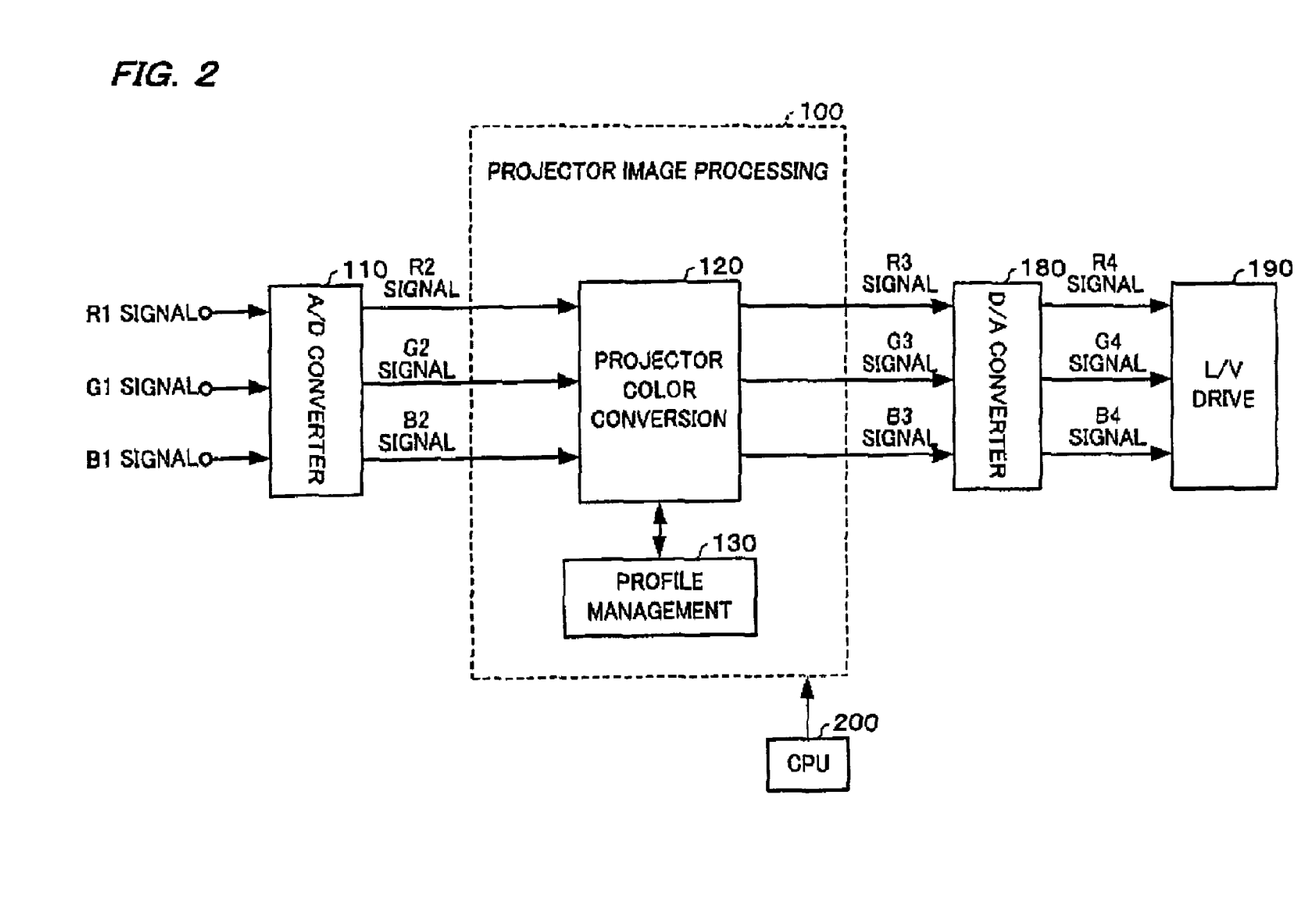
FIG. 2 is a functional block diagram of an image processing section within a conventional projector.

A functional block diagram of the image processing section within a conventional projector is shown in FIG. 2.

This conventional projector inputs an R1 signal, a G1 signal, and a B1 signal (which form RGB signals in analog format, sent from a PC or the like) to an A/D converter section 110, and uses a projector image processing section 100 to perform color conversion on an R2 signal, a G2 signal, and a B2 signal that have been converted into digital form by the A/D converter section 110.

An R3 signal, a G3 signal, and a B3 signal that have been subjected to the color conversion are input to a D/A converter section 180, and an R4 signal, a G4 signal, and a B4 signal that have been converted into analog form are input to a light valve (L/V) drive section 190, to drive a liquid-crystal light valve and thereby display an image.

The projector image processing section 100, which is controlled by a CPU 200 comprises a projector color conversion section 120 and a profile management section 130.

The projector color conversion section 120 converts the RGB digital signals (the R2 signal, G2 signal, and B2 signal) from the A/D converter section 110 into RGB digital signals for projector output (the R3 signal, G3 signal, and B3 signal), based on a projector input-output profiles that are managed by the profile management section 130. Note that "profile" in this case refers to characteristic data.

In this manner, the conventional projector can only perform color conversion based on input-output profiles that indicate input-output characteristics which are specific to that particular projector, and thus no consideration is paid to the viewing environment in which the image is projected and displayed.

However, it is difficult to ensure that the color appearance is uniform with this configuration, without taking the viewing environment into account. The color appearance is detected by three factors: light, the reflection or transmission of light by objects, and vision.

This embodiment of the present invention implements an image display system that can reproduce identical colors, by detecting the viewing environment of light as well as the reflection or transmission of that light by objects, irrespective of the environment in which it is used.

The image appearance is also affected by the distance between the projector 20 and the screen 10. It is possible to measure the distance between the projector 20 and the screen 10 and correct the image from consideration of that distance, but the provision of a distance measurement means in addition to the image correction means would make the image display system itself much larger.

With this embodiment, images are corrected without having to provide a distance measurement means, by applying an image processing method that is not dependent on the distance between the projector 20 and the screen 10.

More specifically, the device is provided with a color light sensor 60 that functions as viewing environment detection means for detecting the viewing environment, as shown in FIG. 1, where viewing environment information from the color light sensor 60 is input to the projector 20. The color light sensor 60 measures viewing environment information (more specifically, RGB or XYZ tristimulus values) within the image display region 12 of the screen 10.

The projector 20 is provided with brightness correction means, for correcting brightness information that is included in the viewing environment information to conform with the brightness of the ideal environment, based on the viewing environment information, if the image brightness in the viewing environment differs from the image brightness in the ideal environment; color difference calculation means for calculating color difference between color information included in the viewing environment information, in which the brightness information has been corrected and color information of an image in the ideal environment; and image correction means for correcting image display information that is used for displaying the image, based on the thus-calculated color difference.

The use of this configuration enables the implementation of an image display system that corrects images, irrespective of the distance between the projector 20 and the screen 10.

Note that the sequence of image processing for correcting the image is such that a white image is projected from the projector 20 to the screen 10 at each of predetermined gray scales and the viewing environment is detected by measuring tristimulus values of the image in the image display region 12 by the color light sensor 60.

The correction of the image display information for each of those gray scales is based on those tristimulus values.

The description now turns to details of the image processing method performed to correct the image, using the functional blocks of the image processing section of the projector 20 which comprises components such as the above brightness correction means.

Figure 3:
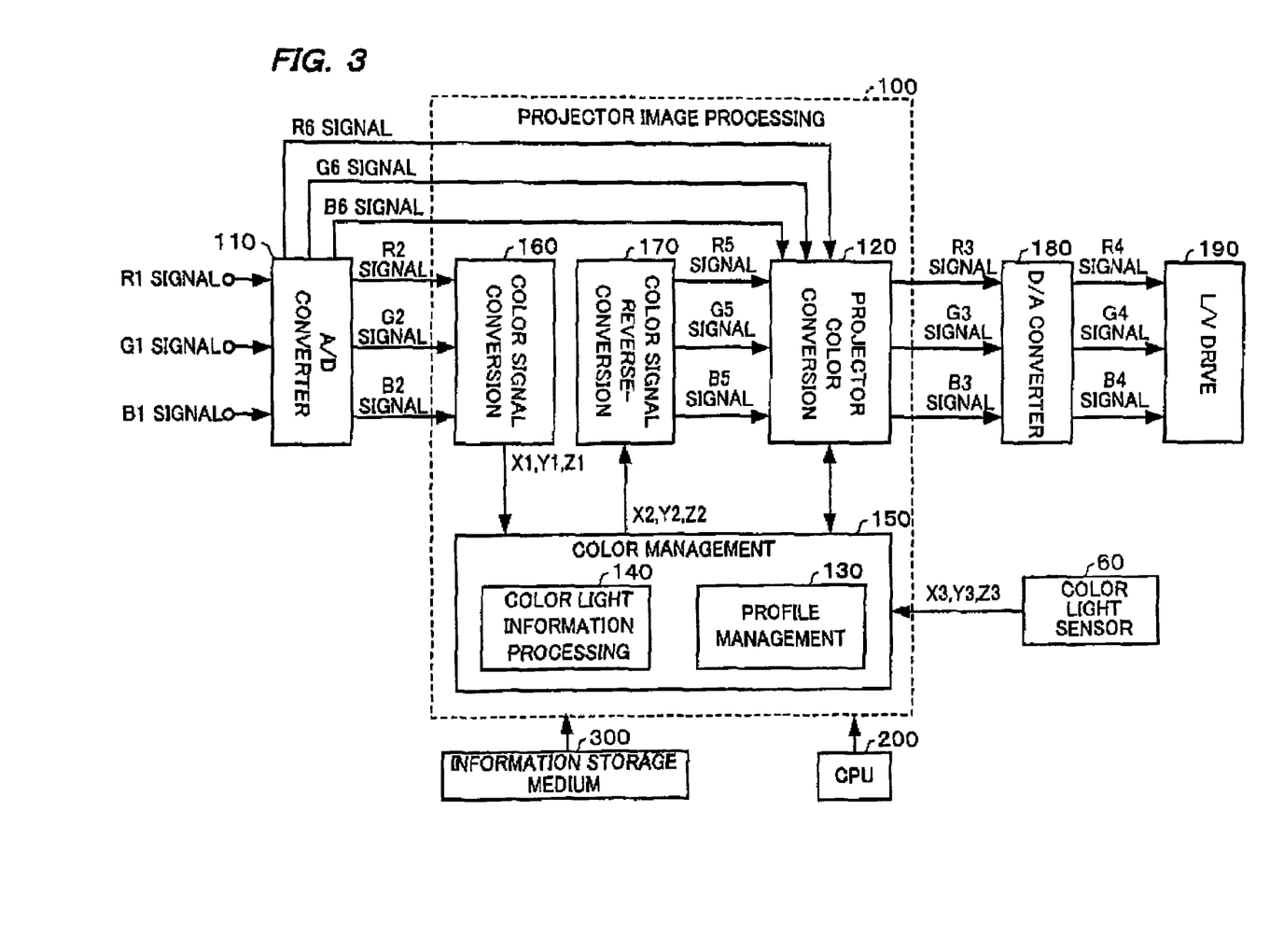
FIG. 3 is a functional block diagram of the image processing section within a projector in accordance with an example of this embodiment.

A functional block diagram of the image processing section within the projector 20 in accordance with an example of this embodiment is shown in FIG. 3.

The projector 20 inputs the R1 signal, G1 signal, and B1 signal (which form RGB signals in analog format, sent from a PC or the like) to the A/D converter section 110, and the projector image processing section 100 performs color conversion on the digital R2 signal, G2 signal, and B2 signal.

The projector 20 inputs the color-converted R3 signal, G3 signal, and B3 signal to the D/A converter section 180, then inputs the analog-converted R4 signal, G4 signal, and B4 signal to the light valve (L/V) drive section 190 which projects and displays an image by driving liquid-crystal light valves.

Up until this point, there is no difference from the configuration of the conventional projector. The projector image processing section 100 of the projector 20 in accordance with this embodiment comprises a color signal conversion section 160, a color signal reverse-conversion section 170, a color management section 150, and the projector color conversion section 120.

The color signal conversion section 160 converts the digital RGB signals (R2 signal, G2 signal, and B2 signal) from the A/D converter section 110 into XYZ values (X1, Y1, Z1). Note that the colors represented by RGB signals are device-dependent colors that are affected by the input-output device, such as the projector 20, whereas the colors represented by the XYZ values are device-independent colors that are the same regardless of the device.

Note also that a method such as a matrix-conversion method using a 3×3 matrix can be used as the specific method for converting from the RGB digital signals to the XYZ values.

The color signal conversion section 160 outputs the thus-converted XYZ values (X1, Y1, Z1) to the color management section 150.

The color management section 150 converts the XYZ values (X1, Y1, Z1), which that have been input from the color signal conversion section 160, into XYZ values (X2, Y2, Z2) that take into account the viewing environment, based on a measured value from the color light sensor 60 that is the viewing environment detection means.

The description now turns to details of the color light sensor 60.

Figure 4:
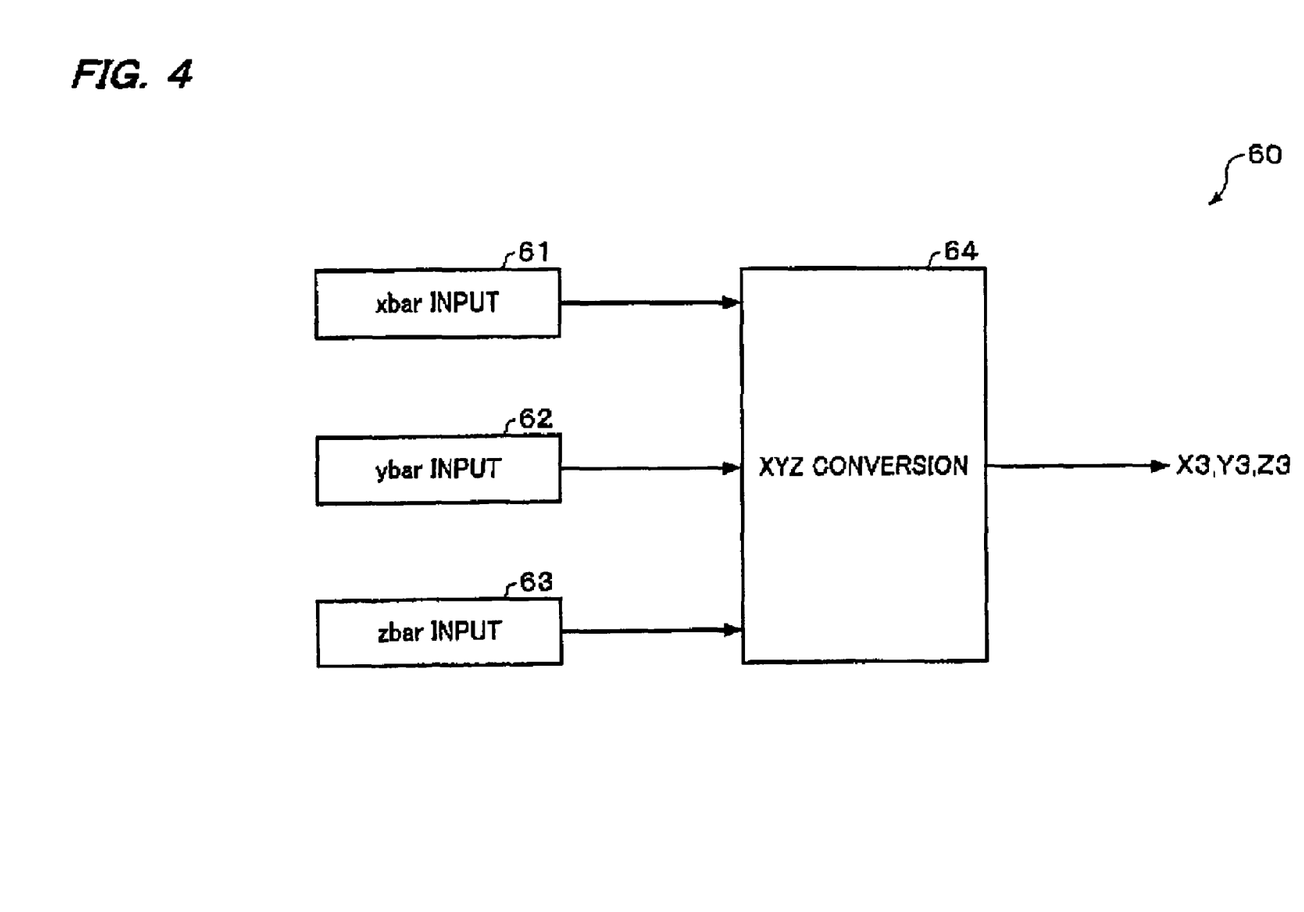
FIG. 4 is a functional block diagram of the color light sensor in accordance with an example of this embodiment.

A functional block diagram of the color light sensor 60 in accordance with an example of this embodiment is shown in FIG. 4. A graph of color matching functions is shown in FIG. 5.

Figure 5:
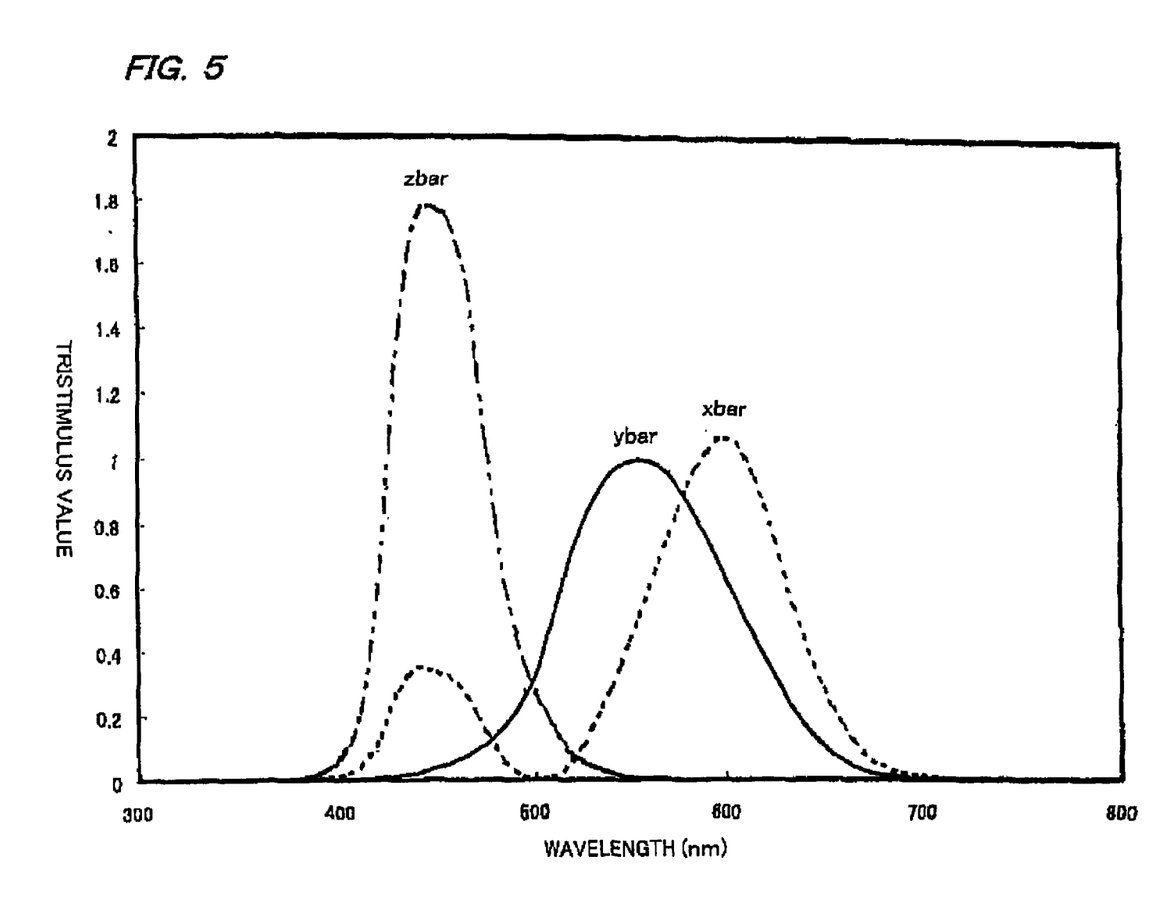
FIG. 5 is a graph of color matching functions.

The color light sensor 60 comprises an xbar input section 61, a ybar input section 62, and a zbar input section 63 that input the corresponding tristimulus values xbar, ybar, and zbar, of the color matching functions in the XYZ color system, as shown in FIG. 5.

The color light sensor 60 also comprises an XYZ conversion section 64 that converts the xbar, ybar, and zbar values, which are input from the xbar input section 61, the ybar input section 62, and the zbar input section 63, into X3, Y3, and Z3 values.

Note that a known conversion formula could be used for converting the xbar value and the like into the X3 value and the like, with the conversion formula being discussed, for example, in *Handbook of Color Science* (second edition), published by University of Tokyo Press.

The color management section 150 also comprises a color light information processing section 140 and the profile management section 130 that manages the above described input-output profiles for the projector 20.

The description now turns to details of the color light information processing section 140.

Figure 6:
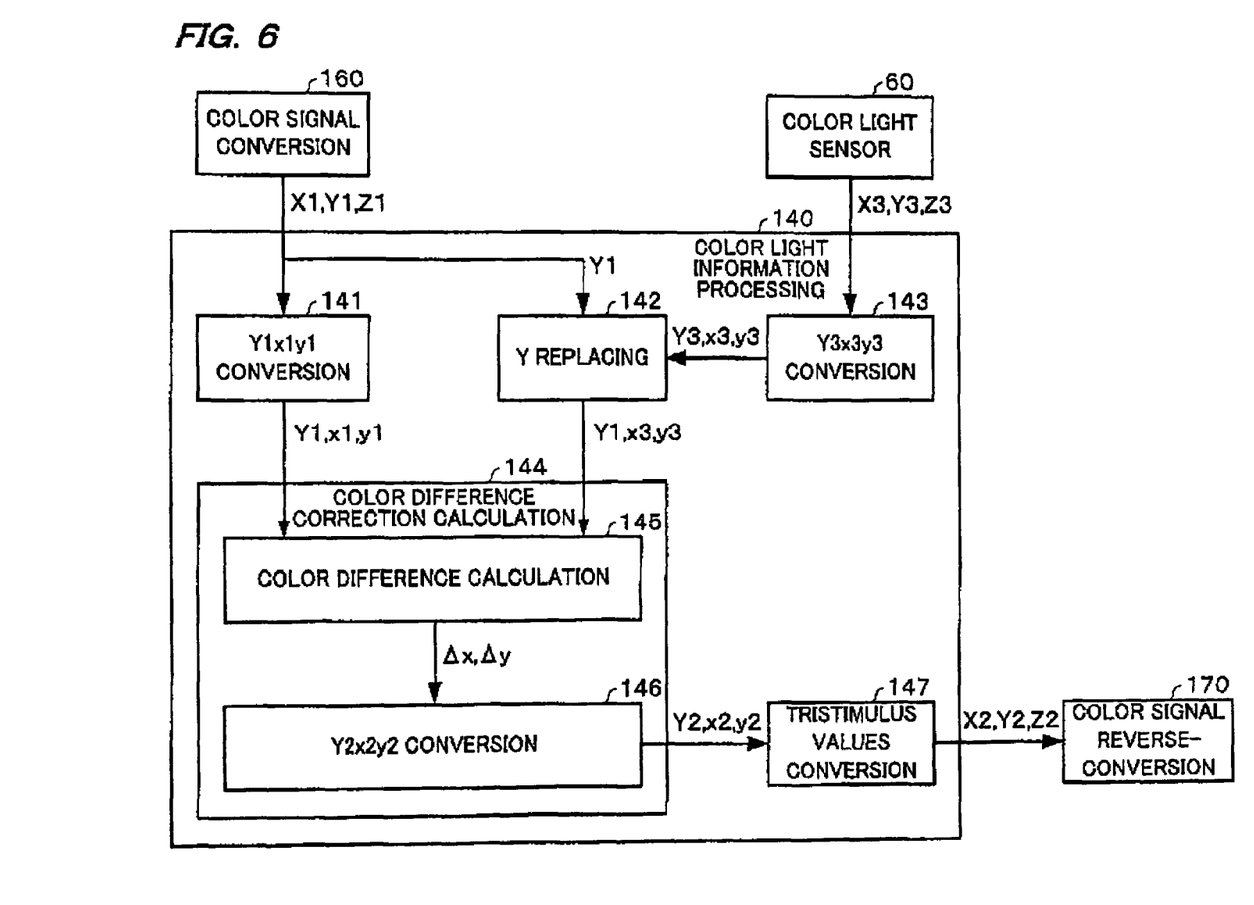
FIG. 6 is a functional block diagram of the color light information processing section in accordance with an example of this embodiment.

A functional block diagram of the color light information processing section 140 in accordance with an example of this embodiment is shown in FIG. 6.

The color light information processing section 140 comprises a Y1x1y1 conversion section 141, which converts color signals (X1, Y1, Z1) in XYZ format for an ideal environment from the color signal conversion section 160 into color signals (Y1, x1, y1) in Yxy format; a Y3x3y3 conversion section 143, which converts color signals (X3, Y3, Z3) in XYZ format from the color light sensor 60 that represent the viewing environment into color signals (Y3, x3, y3) in Yxy format; and a Y replacing section 142 that functions as brightness correction means.

The Y replacing section 142 replaces Y3 of the color signals (y3, x3, y3) with Y1, based on Y1, which is part of the color signals from the color signal conversion section 160, and the color signals (Y3, x3, y3) from the Y3x3y3 conversion section 143.

This makes it possible to calculate the color difference in a state in which the brightness of the color information for the ideal environment and the color information in the actual viewing environment is completed, during processing by the Y replacing section 142 and subsequent components, by converting the brightness information Y3 included in the environment information for the viewing environment into Y1 in such a manner that it conforms with the brightness in the ideal environment. This makes it possible to perform the calculations at a higher speed, because only the color difference for the color alone need be calculated.

The color light information processing section 140 comprises a color difference correction calculation section 144 that calculates color difference and a tristimulus values conversion section 147 that converts color signals into tristimulus values (X2, Y2, Z2), based on the thus-calculated color difference.

The color difference correction calculation section 144 comprises a color difference calculation section 145 and a Y2x2y2 conversion section 146.

The color difference calculation section 145 calculates color difference between the color signals (Y1, x3, y3) from the Y replacing section 142 and the color signals (Y1, x1, y1) from the Y1x1y1 conversion section 141.

Since the Y1 values (indicating brightness) of these two sets of color signals match, the color difference between the values (x3, y3) and (x1, y1) expressed on an xy chromaticity diagram can be calculated.

As a result, the color difference Ax between x3 and x1 and the color difference Δy between y3 and y1 are obtained.

Figure 7:
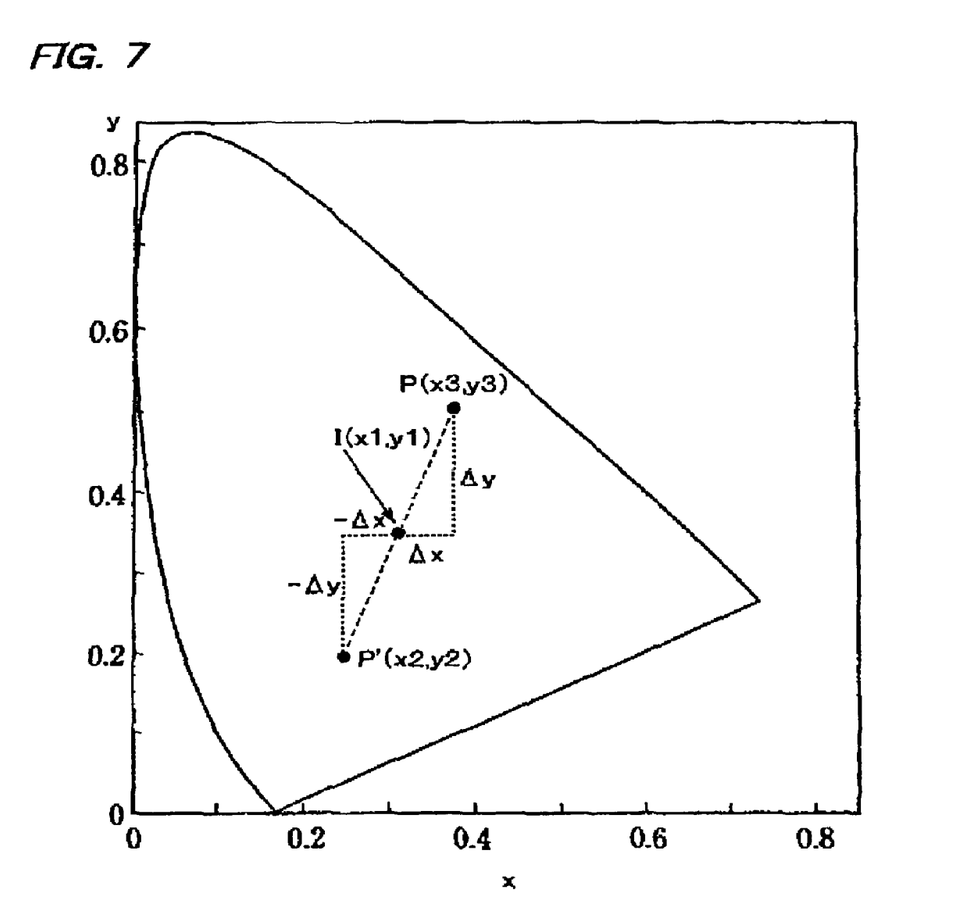
FIG. 7 is a schematic view of color conversion in an xy chromaticity diagram.

A schematic view of the color conversion in an xy chromaticity diagram is shown in FIG. 7.

If it is assumed, by way of example, that a point P (x3, y3) indicates the color of an image in the actual viewing environment and a point I (x1, y1) indicates the color of the image in an ideal environment, the color shift from the ideal color can be expressed by Δx and Δy, as shown in FIG. 7.

To correct this shift, this Δx and Δy could be used as correction amounts for correcting the color of the image.

The point indicating the color after the correction is denoted by a point P' (x2, y2). In other words, it becomes possible to reproduce the ideal color of the point I (x1, y1) in the actual viewing environment, which has been affected by factors such as ambient light, by outputting the color of the point P' (x2, y2).

The Y2x2y2 conversion section 146 outputs values (x2, y2), which are obtained by correcting the ideal color (x1, y1) using Δx and Δy as correction amounts, together with Y2 to the tristimulus values conversion section 147. Note that the tristimulus values conversion section 147 uses Y1 as Y2 without modification.

The tristimulus values conversion section 147 converts the color signals (Y2, x2, y2) from the Y2x2y2 conversion section 146 into tristimulus values (X2, Y2, Z2).

The color light information processing section 140 outputs the tristimulus values (X2, Y2, Z2) from the tristimulus values conversion section 147 to the color signal reverse-conversion section 170.

The profile management section 130 functions as the above described image correction means and creates the input-output profiles for the RGB signals of the projector 20. Note that each input-output profile is part of the information for image display used for displaying images. The profile management section 130 also manages the RGB input-output characteristics of the projector 20, using the thus-created input-output profiles for the RGB signals.

The color signal reverse-conversion section 170 performs a reverse conversion on the XYZ values (X2, Y2, Z2) from the color light information processing section 140 to convert them into RGB digital signals (an R5 signal, a G5 signal, and a B5 signal), using a inverse matrix of the above-described matrix of the color signal conversion section 160.

The projector color conversion section 120 converts the RGB digital signals (the R5 signal, G5 signal, and B5 signal) from the color signal reverse-conversion section 170 into the RGB digital signals (the R3 signal, G3 signal, and B3 signal) for projector output, with reference to projector profiles managed by the profile management section 130.

The projector image processing section 100 that is controlled by the CPU 200 comprises the projector color conversion section 120 and the profile management section 130.

The projector color conversion section 120 converts the RGB digital signals (the R6 signal, G6 signal, and B6 signal) from the A/D converter section 110 into the RGB digital signals for projector output (the R3 signal, G3 signal, and B3 signal), based on the input-output profiles for the RGB signals that are managed by the profile management section 130.

The RGB digital signal for projector output that have been output from the projector color conversion section 120 are converted into the RGB analog signals (the R4 signal, G4 signal, and B4 signal) by the D/A converter section 180, and liquid-crystal light valves are driven by the L/V drive section 190 to project and display an image, based on those RGB analog signals.

As described above, a presentation image that has been corrected in a manner that is appropriated for the viewing environment can be displayed, when image display information is corrected for each gray scales and the actual presentation image is displayed.

Thus images are projected and displayed in this embodiment, taking the viewing environment into account.

This makes it possible to display an image that conforms with the viewing environment during image display, so that differences in display environment can be absorbed and the same image can be displayed irrespective of the environment that is applied. It is therefore possible to reproduce substantially the same colors within a short period of time, at a plurality of different locations.

This embodiment makes it possible to obtain color difference for color alone, excluding the brightness element, by correcting the brightness information that indicates the brightness of the image in the viewing environment to conform with the brightness in an ideal environment.

In particular, it is possible to rapidly obtain the color difference between color values x3 and y3 included in the viewing environment information and the color values x1 and y1 in the ideal environment, by replacing the brightness value Y3 included in the viewing environment information with the brightness value Y1 for the ideal environment.

If the projector 20 is used to project an image on the screen 10, as in this embodiment, the viewing environment information will be affected by the distance between the projector 20 and the screen 10. This means that the image will appear darker with distance. In other words, the brightness information (L value or Y value) included in the viewing environment information will vary with this distance. The color information within the viewing environment information will not, however, be affected by distance. In general, color has more effect than brightness on the image appearance.

In other words, there is little effect on the image appearance, even when the brightness value Y3 included in the viewing environment information is replaced with the brightness value Y1 for the ideal environment, as in this embodiment. It is therefore possible to adjust the image appearance as appropriate, without having to detect the viewing environment again, even if the distance between the display area for the image (such as the screen) and the viewing environment detection means has changed.

Since the image display information can be corrected rapidly irrespective of the distance between the color light sensor 60 and the image display region 12, as described above, it is possible to implement a system that ensures that the image appearance is substantially the same at a plurality of different locations, within a short period of time.

Description of Hardware

Note that the hardware described below by way of example can be used to implement the above described components.

For example, the configuration could be implemented by an A/D converter or the like as the A/D converter section 110; a D/A converter or the like as the D/A converter section 180; a liquid-crystal light valve driver as the L/V drive section 190; an image processing circuit and ASIC or the like as the projector color conversion section 120, the color signal conversion section 160, the color signal reverse-conversion section 170, and the color light information processing section 140; and circuitry having a storage area such as RAM or the like as the profile management section 130. Note that these components could be implemented in a hardware fashion by circuitry, or they could be implemented in a software fashion by drivers.

In addition, the functions of the components could be implemented by reading out a program from an information storage medium 300, as shown in FIG. 3. The information storage medium 300 could be a CD-ROM, DVD-ROM, ROM, RAM, or HDD, by way of example, and the method of reading the program therefrom could be a direct method or an indirect method.

Instead of the information storage medium 300, it is possible to implement the above described functions by downloading a program or the like that implements those functions over a transmission path from a host device or the like. In other words, a program for implementing these functions could be embodied over carrier waves.

The hardware described below may be employed for the color light sensor 60.

The xbar input section 61, the ybar input section 62, and the zbar input section 63 may each be, for example, a color filter and photodiode that are selectively transparent with respect to the corresponding stimulus value, and the XYZ conversion section 64 may be, for example, an A/D converter that converts an analog signal from the photodiode into a digital signal and an op-amp that amplifies that digital signal.

Note the present invention has been described above by way of one embodiment thereof, but the application of the present invention is not limited to the above embodying example.

Modification

For example, the tristimulus values that are input by the color light sensor 60 are not limited to xbar, ybar, and zbar values; they may equally well be XYZ values, RGB values, or rbar, gbar and bbar values that are color matching function values of RGB values, by way of example.

In addition, the viewing environment detection means may be imaging means such as a CCD camera or a CMOS camera, instead of the color light sensor 60.

Furthermore, the description of the embodying example above relates to an example of the correction of an image by the Yxy format, but it is equally possible to perform image correction by another type of representative format having brightness information and color information, such as the Lab format or Luv format. If the Lab format is used, by way of example, it is possible to correct the image by a method similar to the above described one, by reading Y as L and x and y as a and b.

Note that the above described screen 10 is of a reflective type but it may equally well be of a transparent type.

The present invention may also be applied to presentations in which images are displayed by a display means other than a projection means such as the above described projector. Apart from a liquid-crystal projector, this display means may be a cathode ray tube (CRT), a plasma display panel (PDP), a field emission display (FED), an electro-luminescence (EL) device, or a direct-view type liquid crystal display device, or a projector using a digital micro-mirror device (DMD). by way of example. Note that DMD is a tradename registered by Texas Instruments Inc., of the US. In addition, the projector is not limited to a front-projection type device; it may equally well be of a rear-projection type.

The time required for image correction may be shortened by the above described method of replacing brightness information, even when the present invention is applied to the above types of image display means.

Note that it is possible to correct the image irrespective of distance, even when the present invention is applied to image display means in which the distance between the projected position of the image and the display area of the image varies, as in a front-projection type projector.

In addition to presentations, this invention is also effective in the display of images such as those at meetings, during medical treatment, in the design and fashion fields, business activities, commercials, and education, as well as general-purpose images such as those in movies, TV, videos, and games.

Note that the functions of the above-described projector image processing section 100 of the projector 20 could be implemented by a single image display device (such as the projector 20 itself) or by distribution between a plurality of processing devices (such as distributed processing between the projector 20 and a PC).

The invention claimed is:

1. An image display system, comprising:
   viewing environment detection means for detecting a viewing environment in a display area and generating viewing environment information including a luminance value and color information;
   brightness correction means for correcting brightness information included in the viewing environment information from the viewing environment detection means to conform with brightness of an ideal environment, based on the viewing environment information, by replacing the luminance value of the viewing environment information with a luminance value of an input RGB signal from an external device;
   color difference calculation means for calculating color difference between the color information included in the viewing environment information from the viewing environment detection means, in which the brightness information has been corrected, and color information of the image in the ideal environment;

image correction means for correcting image display information based on the calculated color difference; and display means for displaying an image based on the image display information, wherein the viewing environment detection means measures tristimulus values of an image in the display area or captures an image in the display area; and the image display information for the ideal environment and the viewing environment information is expressed in Lab format or Yxy format, and the brightness correction means replaces the L value or Y value of the viewing environment information with the L value or Y value of the image display information for the ideal environment.

2. The image display system as defined in claim 1, comprising a front-projection type image projection device including:

the brightness correction means;
the color difference calculation means;
the image correction means; and
the display means which projects a corrected image towards the display area.

3. An image display system, comprising:

a viewing environment detection section which detects a viewing environment in a display area and generates viewing environment information including a luminance value and color information;

a brightness correction section which corrects brightness information included in the viewing environment information to conform with brightness of an ideal environment, based on the viewing environment information from the viewing environment detection section, by replacing the luminance value of the viewing environment information with a luminance value of an input RGB signal from an external device;

a color difference calculation section which calculates color difference between the color information included in the viewing environment information from the viewing environment detection section, in which the brightness information has been corrected, and color information of the image in the ideal environment;

an image correction section which corrects image display information based on the calculated color difference; and a display section which displays an image based on the image display information, wherein the viewing environment detection section measures tristimulus values of an image in the display area or captures an image in the display area; and the image display information for the ideal environment and the viewing environment information is expressed in Lab format or Yxy format, and the brightness correction section replaces the L value or Y value of the viewing environment information with the L value or Y value of the image display information for the ideal environment.

4. The image display system as defined in claim 3, comprising a projector that projects an image to the display area, the projector including:

the brightness correction section;
the color difference calculation section;
the image correction section; and
the display section.

5. An image processing method, comprising:

generating viewing environment information by detecting a viewing environment in a display area;

detecting color difference between a given image in the viewing environment and the given image in an ideal environment, based on the generated viewing environment information;

correcting image display information based on the detected color difference; and displaying an image, based on the image display information, a) the viewing environment information including:

i) color information indicating color of the image in the viewing environment and brightness information indicating brightness of the image in the viewing environment; and b) detecting color difference including:

i) correcting the brightness information included in the viewing environment information to conform with brightness of the ideal environment, based on the viewing environment information, by replacing a luminance value of the viewing environment information with a luminance value of an input RGB signal from an external device; and ii) calculating the color difference based on the color information included in the viewing environment information, in which the brightness information has been corrected, and color information of the image in the ideal environment, wherein;

the image display information for the ideal environment and the viewing environment information is expressed in Lab format or Yxy format, and correcting brightness comprises replaces the L value or Y value of the viewing environment information with the L value or Y value of the image display information for the ideal environment.

* * * * *